United States Patent Office 3,360,556
Patented Dec. 26, 1967

3,360,556

PREPARATION OF HALOMETHYLPHOSPHINE SULFIDES FROM s-TRITHIANE AND PHOSPHORUS HALIDES

Kurt Moedritzer, Webster Groves, Mo., assignor to Monsanto Research Corporation, St. Louis, Mo., a corporation of Delaware No Drawing. Filed Mar. 15, 1963, Ser. No. 265,346
8 Claims. (Cl. 260—543)

This invention relates to sulfur-containing organic compounds of phosphorus and more particularly provides a new and valuable method of preparing pentavalent phosphorus compounds having a phosphorus/carbon bonded halomethyl radical and sulfur in the isolated position.

According to the invention said pentavalent phosphorus compounds are prepared by reacting certain trivalent phosphorus-halogen compounds with thioformaldehyde or its cyclic trimer, s-trithiane, substantially according to the scheme:

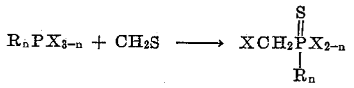

wherein X is halogen and R is selected from the class consisting of hydrocarbon and halogen-substituted hydrocarbon and is free of aliphatic unsaturation and n is a number of zero to 2. The thioformaldehyde shown above may be conveniently replaced by the more readily commercially available s-trithiane since under the reaction conditions the latter is converted to thioformaldehyde.

As is evident from the above reaction scheme, the trivalent phosphorus halogen compound may or may not contain an organic radical; i.e., it may be a phosphorus trihalide, e.g., phosphorus trichloride, tribromide, triiodide or trifluoride, or a mixed trihalide such as a bromide dichloride or a chloride diiodide. Other presently useful trivalent phosphorus halogen compounds are the hydrocarbyl- or halohydrocarbylphosphonous dihalides, i.e., compounds of the formula $RPX_2$, and the dihydrocarbyl-, the bis(halohydrocarbyl)- or hydrocarbyl(halohydrocarbyl)phosphinous halides, i.e., compounds of the formula $R_2PX$, wherein R and X are as defined above. The nature of the hydrocarbon radical is immaterial so long as it is free of aliphatic unsaturation, i.e., it should contain neither the olefinic double bond nor the acetylenic triple bond. Hence it may be alkyl, aryl, aralkyl, alkaryl, cycloalkyl, alkylcycloalkyl, cycloalkylaryl, etc. The hydrocarbyl radical may or may not contain one or more halogen substituents at an aliphatic and/or cyclic carbon atom thereof. Since the hydrocarbyl or the halogen-substituted hydrocarbyl radical does not appear to participate in the reaction, the carbon content thereof may be varied at will and is limited only by the availability of the trivalent phosphorus reactant. Hydrocarbyl- or halogen-substituted hydrocarbylphosphonous dihalides or dihydrocarbyl- or bis(halohydrocarbyl)phosphinous halides having from 1 to 18 carbon atoms are readily available and hence the presently provided method will find the most application with such starting reactants.

Since the reaction takes place by addition of sulfur to phosphorus to give a pentavalent phosphorus compound and addition to phosphorus of the halomethyl radical formed from the cleaved methylene group and a phosphorus bonded halogen, the nature of the pentavalent phosphorus product can be readily ascertained by simply subtracting a phosphorus bonded halogen from the trivalent phosphorus reactant, and adding a halomethyl radical by carbon/phosphorus bonding and an isolated sulfur atom by P═S bonding. Thus, reaction of ethylphosphonous dibromide with thioformaldehyde or s-trithiane gives (bromoethyl)ethylphosphinothioic bromide;

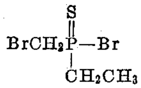

On the other hand, reaction of diethylphosphinous bromide and s-trithiane or thioformaldehyde gives (bromomethyl)diethylphosphine sulfide:

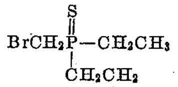

With a phosphorus trihalide, there is formed a halomethylphosphonothioic dihalide:

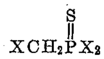

where X is halogen.

Depending upon the reaction conditions, a halomethylphosphonothioic dihalide may also be formed as a byproduct in reaction of s-trithiane or thioformaldehyde and an organic phosphorus halogen compound which is known to give phosphorus trihalide upon thermal decomposition. Thus, at above, say, 150° C. thioformaldehyde and bromomethylphosphonous dibromide yield, in addition to the expected bis(bromomethyl)phosphinothioic bromide, substantial quantity of bromomethylphosphonothioic dibromide, the same product which is obtained by similar heating of phosphorus tribromide with thioformaldehyde.However, irrespective of the heating temperature and time, substantial conversion to the halomethyl sulfur compound occurs. Since it can be readily isolated from the other possible reaction products by methods known to those skilled in the art, e.g., by fractional distillation, crystallization or solvent extraction, the presence of such other reaction products serves only to decrease the yield of the halomethyl sulfur compound:

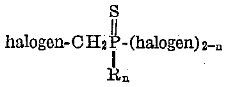

In some instances, particularly when it is desired to employ the halomethyl sulfur compound as a biological toxicant, separation of the latter from a reaction mixture comprising the above-mentioned by-products is not required, since compounds such as those obtained by primary decomposition of the organic trivalent phosphorus reactant into phosphorus trihalide and subsequent reaction of the latter with said trithiane generally also possess some degree of biological toxicity.

Pentavalent halomethyl compounds of phosphorus and sulfur which are obtained according to the invention by reaction of a phosphorus trihalide and thioformaldehyde or s-trithiane are halomethylphosphonothioic dihalides and have the formula

where X is halogen. For example, chloromethylphosphonothioic dichloride is obtained from phosphorus trichloride, iodomethylphosphonothioic dichloride is obtained from phosphorus dichloride iodide, etc.

Halomethyl hydrocarbyl or halohydrocarbylphosphinothioic halide obtained by the present process from thioformaldehyde or s-trithiane and a hydrocarbylphosphonous dihalide or a halohydrocarbyl phosphonous dihalide have the general formula

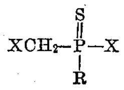

where R is hydrocarbon or halogen-substituted hydrocarbon and is free of aliphatic unsaturation and X is halogen. Thus R may be alkyl, aryl, aralkyl, alkaryl, cycloalkyl, alkyl cycloalkyl, or aryl cycloalkyl and may or may not contain halogen substitution. Specific examples thereof are:

(Chloromethyl)propylphosphinothioic chloride from propylphosphonous dichloride
(Bromomethyl)butylphosphinothioic bromide from butylphosphonous dibromide
(Bromomethyl)methylphosphinothioic chloride from methylphosphonous bromide chloride
(Fluoromethyl)ethylphosphinothioic fluoride from ethylphosphonous difluoride
(Chloromethyl)hexylphosphinothioic chloride from hexylphosphonous dichloride
(Chloromethyl)decylphosphinothioic chloride from decylphosphonous dichloride
(Chloromethyl)dodecylphosphinothioic chloride from dodecylphosphonous dichloride
(Bromomethyl)octadecylphosphinothioic bromide from octadecylphosphonous dibromide
(Iodomethyl)docosanylphosphinothioic iodide from docosanylphosphonous diiodide
(Chloromethyl)hexacosanylphosphinothioic chloride from hexadocosanylphosphonous dichloride
(Chloromethyl)cyclopropylphosphinothioic chloride from cyclopropylphosphonous chloride
(Chloromethyl)cyclopentylphosphinothioic chloride from cyclopentylphosphonous dichloride
(Bromomethyl)cyclohexylphosphinothioic bromide from cyclohexylphosphonous dibromide
(Bromomethyl)tetrahydronaphthylphosphinothioic bromide from tetrahydronaphthylphosphonous dibromide
(Iodomethyl)-2-acenaphthenylphosphinothioic iodide from 2-acenaphthenylphosphonous diiodide
(Bromomethyl)phenylphosphinothioic bromide from phenylphosphonous dibromide
(Chloromethyl)-β-naphthylphosphinothioic chloride from β-naphthylphosphonous dichloride
(Chloromethyl)-2-anthracenylphosphinothioic chloride from 2-anthracenylphosphonous dichloride
(Chloromethyl)-p-tolylphosphinothioic chloride from p-tolylphosphonous dichloride
(Iodomethyl)(4-hexylphenyl)phosphinothioic iodide from 4-hexylphenylphosphonous diiodide
(Bromomethyl)(3-octadecylphenyl)phosphinothioic bromide from 3-octadecylphenylphosphonous dibromide
(Fluoromethyl)(2,3-dimethylphenyl)phosphinothioic fluoride from 2,3-dimethylphenylphosphonous difluoride
(Chloromethyl)(pentaethylphenyl)phosphinothioic chloride from pentaethylphenylphosphonous dichloride
(Chloromethyl)benzylphosphinothioic chloride from benzylphosphonous dichloride
(Bromomethyl)(2-phenylethyl)phosphinothioic bromide from 2-phenylethylphosphonous dibromide
(Chloromethyl)(4-cyclohexylphenyl)phosphinothioic chloride from 4-cyclohexylphenylphosphonous dichloride
(Chloromethyl)-4-biphenylphosphinothioic chloride from 4-biphenylphosphonous dichloride
Bis(bromomethyl)phosphinothioic bromide from bromomethylphosphonous dibromide
(Chloromethyl)(4-chlorobutyl)phosphinothioic chloride from 4-chlorobutylphosphonous dichloride
(Chloromethyl)(3,4-dibromophenyl)phosphinothioic chloride from 3,4-dibromophenylphosphonous dichloride
(Chloromethyl)(perfluoroheptyl)phosphinothioic chloride from perfluoroheptylphosphonous dichloride
(Iodomethyl)(4-iodocyclopentyl)phosphinothioic iodide from 4-iodocyclopentylphosphonous diiodide
(Chloromethyl)(pentachlorophenyl)phosphinothioic chloride from pentachlorophenylphosphonous dichloride When the trivalent phosphorus reactant is a dihydrocarbyl- or bis(halohydrocarbyl)phosphinous halide, there are obtained (halomethyl)- dihydrocarbyl- or (halomethyl)bis(halohydrocarbyl)phosphine sulfides. The products obtained upon heating said phosphinous halides with thioformaldehyde or s-trithiane have the formula

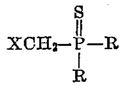

where R is as above defined. Thus:

Dipropylphosphinous chloride gives (chloromethyl)dipropylphosphine sulfide
Bis(2-ethylhexyl)phosphinous bromide gives bis(2-ethylhexyl)(bromomethyl)phosphine sulfide
Diphenylphosphinous chloride gives (chloromethyl) diphenylphosphine sulfide
Ethylphenylphosphinous iodide gives ethyl(iodomethyl) phenylphosphine sulfide
Dicyclohexylphosphinous bromide gives (bromomethyl) dicyclohexylphosphine sulfide
Dibenzylphosphinous chloride gievs dibenzyl(chloromethyl)phosphine sulfide
Di-p-tolylphosphinous fluoride gives di-p-tolyl(fluoromethyl)phosphine sulfide
Dibiphenylphosphinous chloride gives dibiphenyl(chloromethyl)phosphine sulfide
Dioctadecylphosphinous bromide gives (bromomethyl) dioctadecylphosphine sulfide
Bis(4-chlorobutyl)phosphinous bromide gives (bromomethyl)bis(4-chlorobutyl)phosphine sulfide
Bis(2,3-dichlorophenyl)phosphinous bromide gives (bromomethyl)bis(2,3-dichlorophenyl)phosphine sulfide
Bis(β-bromo-α-naphthyl)phosphinous bromide gives (bromomethyl)bis(β-bromo-α-naphthyl)phosphine sulfide In order to have the reaction take place at reasonably rapid rates, it is preferably carried out at somewhat elevated temperatures, for example, at above 50° C. and preferably at above 100° C. The only upper limitations upon the reaction temperature are ones imposed by virtue of potential decomposition of the reactants or products at extremely high temperatures. Such decomposition temperatures will vary with the particular radicals or groups present on the specific trivalent phosphorous compound which is employed as starting material or with the pentavalent thiono phosphorus compound produced. In most cases, adequate reaction rates are obtained without substantial decomposition at temperatures between 100° C. and about 300° C., and preferably between about 120° C. and about 220° C.

Since reaction occurs with addition of one mole of thioformaldehyde to one mole of the trivalent phosphorus halogen compound, the two reactants may be used in such stoichiometric proportions, with one mole of s-trithiane, of course, being regarded as the equivalent of 3 moles of thioformaldehyde. However, in order to assure participation of the generally more expensive trivalent phosphorus reactant, it is usually advantageous to employ an excess of the sulfur reactant. Such excess can be recovered readily from the final reaction product, e.g., by filtration or solvent extraction. Progress of the reaction is conveniently followed by removing samples of the reaction mixture at intervals and analyzing them, say, by phosphorus[31] nuclear magnetic resonance spectroscopy.

The invention is further illustrated by, but not limited to, the following examples.

*Example 1*

A mixture consisting of 0.88 g. of s-trithiane and 9.4 g. of phosphorus trichloride in a sealed tube was heated for 5 days at 150° C. Analysis of the resulting reaction product showed that phosphorus trichloride had been converted to chloromethylphosphonothioic dichloride, $ClCH_2P(S)Cl_2$, having a $P^{31}$ nuclear magnetic resonance shift at —76.5 p.p.m. In other runs, the same reactants in the same proportion were heated for 3 days at 175° C. or for 3 days at 200° C. In both cases, chloromethylphosphonothioic dichloride was obtained, the yield of the dichloride being better at the 200° C. temperature than at either 150° C. or 175° C.

*Example 2*

A mixture consisting of 13.7 g. of phosphorus tribromide and 0.67 g. of s-trithiane was heated in a sealed tube for 3 days at 200° C. Analysis of the resulting reaction product showed that the phosphorus tribromide had been converted into bromomethylphosphonothioic dibromide, $BrCH_2P(S)Br_2$, having a strong $P^{31}$ nuclear magnetic resonance signal in the range of —16 to —19 p.p.m.

*Example 3*

A mixture consisting of 7.4 g. of chloromethylphosphonous dichloride, $ClCH_2PCl_2$, and 0.96 g. of s-trithiane was heated in a sealed tube for 5 days at 150° C. There was thus obtained both bis(chloromethyl)phosphinothioic chloride $[(ClCH_2)_2P(S)Cl]$ having a $P^{31}$ nuclear magnetic resonance chemical shift at —86.6 p.p.m. and chloromethylphosphonothioic dichloride, $ClCH_2P(S)Cl_2$, having a $P^{31}$ nuclear magnetic resonance chemical shift at —75.7 p.p.m. Substantially the same results were obtained by heating at 175° C. or at 200° C. for 3 days. Formation of the chloromethylphosphonothioic dichloride probably proceeded through intermediate decomposition of the chloromethylphosphonous dichloride to phosphorus trichloride, since the latter was identified as a byproduct. The latter then reacted with the trithiane as in Example 1.

*Example 4*

A mixture of 0.72 g. of s-trithiane and 6.1 g. of phenylphosphonous dichloride was heated at 175° C. for 3 days. There was thus obtained as reaction product a mixture consisting of about 80% by weight of (chloromethyl)phenylphosphinothioic chloride, $(ClCH_2)C_6H_5P(S)Cl$, having $P^{31}$ nuclear magnetic resonance chemical shift at —75.7 p.p.m., and about 20% by weight of phenylphosphonothioic dichloride, $C_6H_5P(S)Cl_2$, having a $P^{31}$ nuclear magnetic resonance chemical shift at —81.8 p.p.m.

*Example 5*

A mixture consisting of 0.6 g. of s-trithiane and 2.0 g. of dimethylphosphinous chloride, $(CH_3)_2PCl$ was heated in a sealed tube at 175° C. for 3 days. There was thus obtained substantial conversion to (chloromethyl) dimethylphosphine sulfide, $(CH_2Cl)(CH_3)_2PS$, having a $P^{31}$ nuclear magnetic resonance chemical shift at —44.3 p.p.m.

What I claim is:

1. The method of reacting s-trithiane, at a temperature of above about 50° C., with a trivalent phosphorus compound of the formula $R_nPX_{3-n}$ wherein R is selected from the class consisting of hydrocarbon and halogen-substituted hydrocarbon and is free of aliphatic unsaturation, X is selected from the class consisting of chlorine and bromine, and *n* is a number of zero to 1, whereby said trivalent phosphorus compound is converted to a compound of the formula

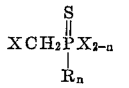

wherein X and *n* are as above defined.

2. The method defined in claim 1, further limited in that R is hydrocarbon.

3. The method defined in claim 1, further limited in that R is halogen-substituted hydrocarbon.

4. The method of reacting s-trithiane at a temperature of between about 100° C. and 300° C., with a hydrocarbon phosphonous dichloride which is free of aliphatic unsaturation, whereby said dichloride is converted to a compound of the formula

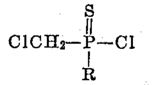

wherein R is hydrocarbon and is free of aliphatic unsaturation.

5. The method which comprises reacting s-trithiane with phosphorus trichloride at a temperature of between about 100° C. and 300° C., whereby the trichloride is converted to chloromethylphosphonothioic dichloride.

6. The method of reacting s-trithiane with phosphorus tribromide at a temperature of between about 100° C. and 300° C., whereby the tribromide is converted to bromomethylphosphonothioic dibromide.

7. The method of reacting s-trithiane with chloromethylphosphonous dichloride at a temperature of between about 100° C. and 300° C., whereby said dichloride is converted to bis(chloromethyl)phosphinothioic chloride.

8. The method of reacting s-trithiane with phenylphosphonous dichloride at a temperature of between about 100° C. and 300° C., whereby said dichloride is converted to (chloromethyl)phenylphosphinothioic chloride.

References Cited

Crofts et al., J. Am. Chem. Soc., vol. 75, 1953, pp. 5738–5740.

Houben-Weyl, Methoden der Organischen Chemie, 1963, vol. 12, part 1, pp. 403–404.

Kabachnik et al., Doklady Akad. Nauk SSSR, vol. 75, 1950, pp. 219–22.

Kabachnik et al., Izvest, Akad. Nauk SSSR, Otdel Khim, Nauk, 1951, pp. 185–191.

LORRAINE A. WEINBERGER, *Primary Examiner.*

L. ZITVER, *Examiner.*

B. M. EISEN, H. C. WEGNER, *Assistant Examiners.*